(12) United States Patent
Kabbani et al.

(10) Patent No.: US 9,184,999 B1
(45) Date of Patent: Nov. 10, 2015

(54) LOGICAL TOPOLOGY IN A DYNAMIC DATA CENTER NETWORK

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/872,626

(22) Filed: Apr. 29, 2013

Related U.S. Application Data

(60) Provisional application No. 61/787,909, filed on Mar. 15, 2013.

(51) Int. Cl.
*H04L 1/00* (2006.01)
*H04L 12/24* (2006.01)

(52) U.S. Cl.
CPC ..................... *H04L 41/12* (2013.01)

(58) Field of Classification Search
USPC ............... 370/254–255, 351, 386–388, 400; 709/220–223
See application file for complete search history.

(56) References Cited

U.S. PATENT DOCUMENTS

| | | | |
|---|---|---|---|
| 6,094,417 A | 7/2000 | Hansen et al. | |
| 6,626,586 B1 | 9/2003 | Jaeger | |
| 6,711,324 B1 | 3/2004 | Zang et al. | |
| 7,606,494 B1 | 10/2009 | Weston-Dawkes et al. | |
| 7,830,789 B2 | 11/2010 | Hashiguchi et al. | |
| 8,195,784 B2 * | 6/2012 | Smith et al. | 709/223 |
| 8,370,490 B2 * | 2/2013 | Deng et al. | 709/225 |
| 8,660,010 B2 | 2/2014 | Zolfaghari et al. | |
| 2002/0027885 A1 | 3/2002 | Ben-Ami | |
| 2005/0002603 A9 | 1/2005 | Beshai et al. | |
| 2005/0033742 A1 | 2/2005 | Kamvar et al. | |
| 2006/0153496 A1 | 7/2006 | Tanobe et al. | |
| 2010/0129078 A1 | 5/2010 | Weston-Dawkes et al. | |
| 2010/0266281 A1 | 10/2010 | Wang et al. | |
| 2011/0176804 A1 | 7/2011 | Biinkert et al. | |

(Continued)

FOREIGN PATENT DOCUMENTS

WO   WO-2013/091688 A1   6/2013

OTHER PUBLICATIONS

Curtis et al, Rewire: An Optimization-based Framework for Unstructured Data Center Network Design, IEEE, 9 pages, 2012.*

(Continued)

*Primary Examiner* — Frank Duong
(74) *Attorney, Agent, or Firm* — Edward A. Gordon; Foley & Lardner LLP

(57) ABSTRACT

A system for configuring a network topology in a data center is disclosed. The data center includes nodes having ports capable of supporting data links that can be connected to other nodes. The system includes a memory and a processing unit coupled to the memory. The processing unit receives demand information indicative of demands between nodes. The processing unit determines a set of constraints on the network topology based on the nodes, feasible data links between the nodes, and the demand information. The processing unit determines an objective function based on a sum of data throughput across data links satisfying demands. The processing unit performs an optimization of the objective function subject to the set of constraints using a linear program. The processing unit configures the network topology by establishing data links between the nodes according to results of the optimization.

18 Claims, 13 Drawing Sheets

(56) References Cited

U.S. PATENT DOCUMENTS

| | | | |
|---|---|---|---|
| 2012/0008945 A1* | 1/2012 | Singla et al. ............... | 398/49 |
| 2012/0128354 A1 | 5/2012 | Panwar et al. | |
| 2012/0182865 A1 | 7/2012 | Andersen et al. | |
| 2013/0083701 A1 | 4/2013 | Tomic et al. | |
| 2013/0308444 A1 | 11/2013 | Sem-Jacobsen et al. | |
| 2014/0270762 A1 | 9/2014 | Li et al. | |

OTHER PUBLICATIONS

Thiagarajan et al., "Capacity Fairness of WDM Networks with Grooming Capabilities" OptiComm 2000: Optical Network and Communications, Proceedings of SPIE vol. 4223, Sep. 2000, 11 Pages.

US Office Action in U.S. Appl. No. 13/872,630 dated Nov. 18, 2014.

Farrington et al. Helios: A Hybrid Electrical/Optical Switch Architecture for Modular Data Centers, Proceedings of the ACM SIGCOMM Conference, Aug. 30013Sep. 3, 2010, New Delhi, India (12 pages).

US Notice of Allowance in U.S. Appl. No. 13/904,804 DTD Feb. 2, 2015.

US Notice of Allowance in U.S. Appl. No. 13/904,804 DTD Jun. 11, 2015.

US Notice of Allowance in U.S. Appl. No. 14/166,011 DTD May 22, 2015.

US Notice of Allowance in U.S. Appl. No. 13/872,630 DTD Mar. 23, 2015.

US Notice of Allowance in U.S. Appl. No. 14/166,011 dated Jul. 22, 2015.

US Notice of Allowance in U.S. Appl. No. 13/872,630 dated Jul. 20, 2015.

* cited by examiner (a)

(b)

(c)

(d)

(e)

LOGICAL TOPOLOGY IN A DYNAMIC DATA CENTER NETWORK

CROSS-REFERENCE TO RELATED APPLICATIONS

This application claims a priority benefit, under 35 U.S.C. §119(e), to U.S. Provisional Patent Application Ser. No. 61/787,909, filed Mar. 15, 2013, and entitled "Logical Topology in a Dynamic Data Center Network," the disclosure of which is hereby incorporated by reference herein.

BACKGROUND

Cloud computing and its applications are effecting a qualitative shift in the way people communicate and share information. Making data available as it is requested from many different sources by many different users involves requesting and receiving data that is routed through and from datacenters according to complex routing schemes across complex network topologies. Inefficiently designed network topologies can lead to data bottlenecks and potential degradation or disruption of data availability. Current data centers contain predetermined topology structures for switching and interconnecting Internet data to a given destination.

SUMMARY

One exemplary implementation is a system for configuring a network topology in a data center. The data center includes a plurality of nodes, and each node includes ports capable of supporting data links that can be connected to a selected other node of the plurality of nodes. The system includes a memory to store processor-executable instructions and a processing unit coupled to the memory. Execution of the processor-executable instructions by the processing unit causes the processing unit to receive demand information indicative of expected demand for data-transfer capacities between ordered pairs of nodes in the plurality of nodes. The processing unit also determines a set of constraints on the network topology based on the nodes, feasible data links between the nodes, and the demand information. The processing unit also determines an objective function based on a sum of data throughput across data links in the data center satisfying demands according to the demand information. The processing unit also performs an optimization of the objective function subject to the set of constraints using a linear program. The processing unit also configures the network topology in the data center by establishing data links between the nodes in the plurality of nodes according to results of the optimization.

Another exemplary implementation is a system for configuring a network topology in a data center. The data center includes a plurality of nodes, and each node includes ports capable of supporting data links that can be connected to a selected other node of the plurality of nodes. The system includes a memory to store processor-executable instructions and a processing unit coupled to the memory. Execution of the processor-executable instructions by the processing unit causes the processing unit to receive demand information indicative of expected demand for data-transfer capacities between ordered pairs of nodes in the plurality of nodes. In a first phase, the processing unit assigns a first set of links between pairs of nodes such that each of the links satisfies a demand from at least one node of a given pair of nodes to the other node of the given pair of nodes. In a second phase, the processing unit assigns unutilized capacity remaining on the first set of links after the first phase, so as to satisfy demands between pairs of nodes via multi-hop routes. In a third phase, the processing unit assigns a second set of links between pairs of nodes to create new multi-hop routes, so as to satisfy demands between pairs of nodes via the new multi-hop routes. In a fourth phase the processing unit assigns a third set of links between pairs of nodes to minimize unutilized ports.

Another exemplary implementation is a method for configuring a network topology in a data center. The data center includes a plurality of nodes, and each node includes ports capable of supporting data links that can be connected to a selected other node of the plurality of nodes. The method includes receiving demand information indicative of expected demand for data-transfer capacities between ordered pairs of nodes in the plurality of nodes. The method also includes determining a set of constraints on the network topology based on the nodes, feasible data links between the nodes, and the demand information. The method also includes determining an objective function based on a sum of data throughput across data links in the data center satisfying demands according to the demand information. The method also includes performing an optimization of the objective function subject to the set of constraints using a linear program. The method also includes configuring the network topology in the data center by establishing data links between the nodes in the plurality of nodes according to results of the optimization.

Another exemplary implementation is a method for configuring a network topology in a data center. The data center includes a plurality of nodes. Each node includes ports capable of supporting data links that can be connected to a selected other node of the plurality of nodes. The method includes receiving demand information indicative of expected demand for data-transfer capacities between ordered pairs of nodes in the plurality of nodes. The method also includes, in a first phase, assigning a first set of links between pairs of nodes such that each of the links satisfies a demand from at least one node of a given pair of nodes to the other node of the given pair of nodes. The method also includes, in a second phase, assigning unutilized capacity remaining on the first set of links after the first phase, so as to satisfy demands between pairs of nodes via multi-hop routes. The method also includes, in a third phase, assigning a second set of links between pairs of nodes to create new multi-hop routes, so as to satisfy demands between pairs of nodes via the new multi-hop routes. The method also includes, in a fourth phase, assigning a third set of links between pairs of nodes to minimize unutilized ports.

Another exemplary implementation is non-transitory computer-readable storage media storing processor-executable instructions. When executed by one or more processors, the instructions cause the one or more processors to receive demand information indicative of expected demand for data-transfer capacities between ordered pairs of nodes in a plurality of nodes in a data center. Each node includes ports capable of supporting data links that can be connected to a selected other node of the plurality of nodes. The instructions also cause the one or more processors to determine a set of constraints on a network topology in the data center based on the nodes, feasible data links between the nodes, and the demand information. The instructions also cause the one or more processors to determine an objective function based on a sum of data throughput across data links in the data center satisfying demands according to the demand information. The instructions also cause the one or more processors to perform an optimization of the objective function subject to the set of constraints using a linear program. The instructions also cause the one or more processors to configure the network topology in the data center by establishing data links between the nodes in the plurality of nodes according to results of the optimization.

Another exemplary implementation is non-transitory computer-readable storage media storing processor-executable instructions. When executed by one or more processors, the instructions cause the one or more processors to receive demand information indicative of expected demand for data-transfer capacities between ordered pairs of nodes in a plurality of nodes in a data center. Each node includes ports capable of supporting data links that can be connected to a selected other node of the plurality of nodes. The instructions also cause the one or more processors to, in a first phase, assign a first set of links between pairs of nodes such that each of the links satisfies a demand from at least one node of a given pair of nodes to the other node of the given pair of nodes. The instructions also cause the one or more processors to, in a second phase, assign unutilized capacity remaining on the first set of links after the first phase, so as to satisfy demands between pairs of nodes via multi-hop routes. The instructions also cause the one or more processors to, in a third phase, assign a second set of links between pairs of nodes to create new multi-hop routes, so as to satisfy demands between pairs of nodes via the new multi-hop routes. The instructions also cause the one or more processors to, in a fourth phase, assign a third set of links between pairs of nodes to minimize unutilized ports.

BRIEF DESCRIPTION OF THE DRAWINGS

Illustrative implementations are hereinafter described, wherein like reference numerals refer to like elements, in which.

DETAILED DESCRIPTION

Figure 1:
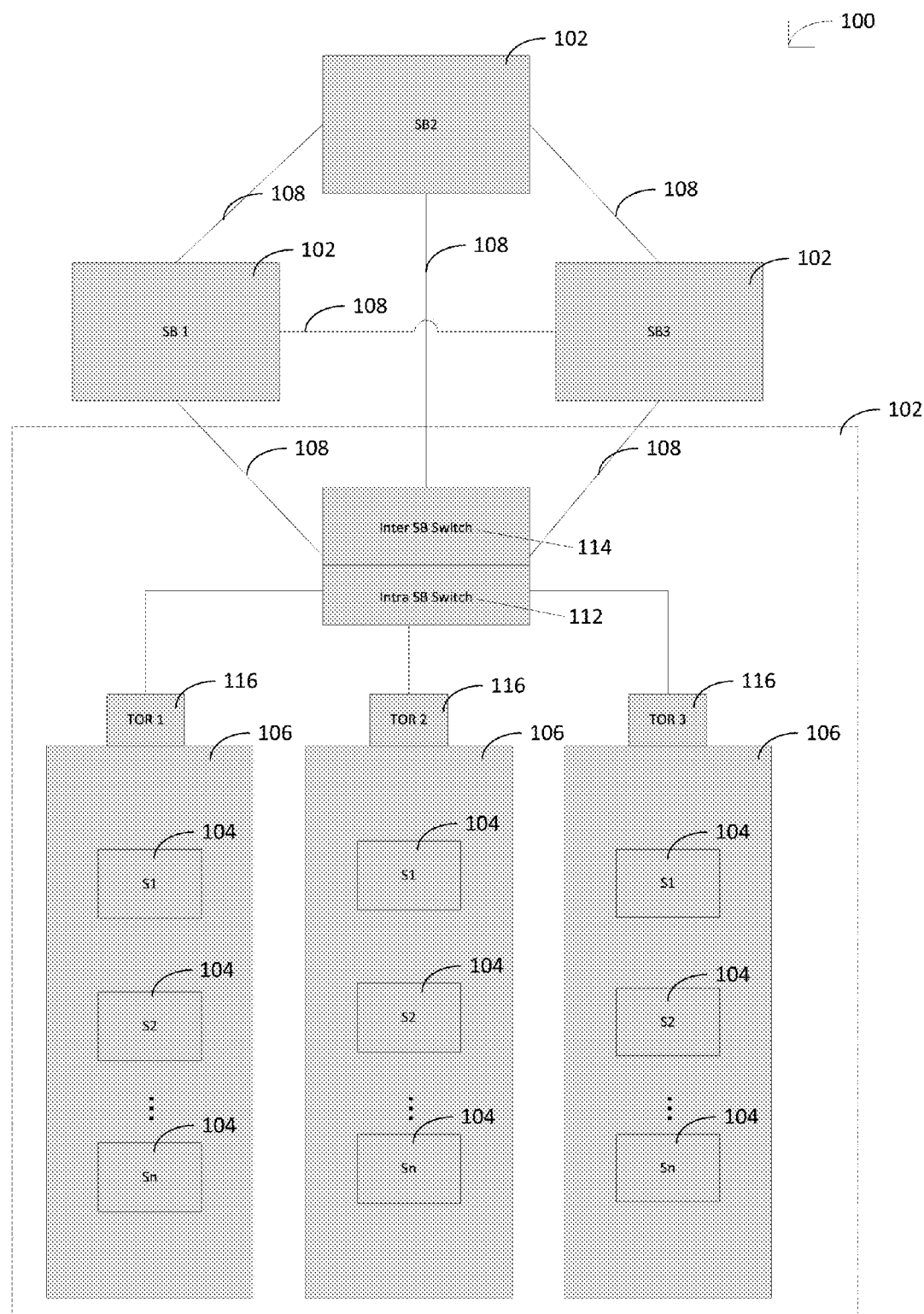
FIG. 1 is an system diagram depicting a data center according to an exemplary implementation.

Before describing in detail the particular innovative systems and methods discussed herein, it should be observed that the several disclosed implementations include, but are not limited to a novel structural combination of conventional data/signal processing components and communications circuits, and not in the particular detailed configurations thereof. Accordingly, the structure, methods, functions, control and system of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the disclosed implementations are not limited to the particular implementations depicted in the example diagrams, but should be construed in accordance with the language in the claims.

FIG. 1 is a block diagram of an example data center 100. The data center 100 includes several interconnected superblocks 102 (also referred to as "pods"). Each superblock 102 includes on the order of several hundred to more than one thousand servers 104 arranged in server racks 106. The superblocks 102 are communicatively coupled to one another by optical and/or electrical communication links 108. They can be connected directly, or through spine blocks (not shown), which serve as switches for routing data communications between the superblocks 102. The superblock includes an intra-superblock switch 112 (also referred to as a "chip") for routing communications among the racks 106 included in the superblock 102 or to an inter-superblock switch 114, which routes data communications between superblocks 102. In some implementations, the inter-superblock switch 114 can be a spine block or it can be switch within the superblock for direct routing of communications between superblocks.

As indicated above, each superblock 102 includes a large number of servers 104. In some implementations, a superblock 102 may include hundreds or more than one thousand servers. The servers 104 are arranged in server racks 106. A top-of-rack (ToR) switch 116 routes data communications between servers 104 within a given rack 106 and from servers within the rack to the intra-superblock switch 112.

Each server 104 includes at least one processor, memory, and a network interface card (NIC), coupled to one another via a data bus. The processor executes computer executable instructions stored in the memory to implement a wide variety of applications and operations. In some implementations, processor executes computer executable code associated with a hypervisor, also referred to as a virtual machine manager. As would be understood by a person of ordinary skill in the art, a hypervisor is an application that creates and manages virtual machines, providing the virtual machines with a virtual operating platform. The virtual machines, in turn, share the physical resources of the server 104, and execute a variety of applications in isolated environments instantiated by the hypervisor. Data communications originating from an application within a virtual machine to other physical or virtual machines are also managed by the hypervisor. The hypervisor directs communications to off-server devices or virtual machines to the NIC, which the hypervisor controls in part through a NIC driver module.

As noted above, a data center usually contains several large superblocks (sometimes also referred to as "pods"). Each superblock is made up from hundreds or thousands of servers connected to ToRs, where ToRs within the same superblock are interconnected via a hierarchy of other switches (chips).

Since (i) the top-tier layer(s) of chips within a superblock can be also leveraged to interconnect other super blocks, and (ii) the connectivity degree of a superblock is typically much larger than the total number of superblocks within the same data center, in some implementations superblocks are interconnected directly (by using some or all of its outgoing links) instead of completely relying on dedicated spineblocks for interconnecting superblocks. Doing so not only reduces the material cost, but also is useful for reducing inter-superblock switching latency. In some implementations, an intra-superblock topology can be determined that can provide certain inter-superblock fairness and bandwidth guarantees for a particular traffic demand matrix. In the discussion of the following implementations, the traffic demands have been already estimated ahead of time and it is assumed they will continue to hold for as long as a topology is maintained. In some implementations, the procedures described here are extended to heterogeneous networks where superblocks are partially connected directly and partially connected indirectly via spineblocks.

It is advantageous for data center networks to have some notion of fairness that ensures no demands will be starved or severely disadvantaged relative to other demands. One reason for this is avoiding the situation when few very slow subflows cause the overall completion time of synchronized applications to become very long. Accordingly, a network topology configuration system can be implemented to enforce such fairness.

Figure 4:
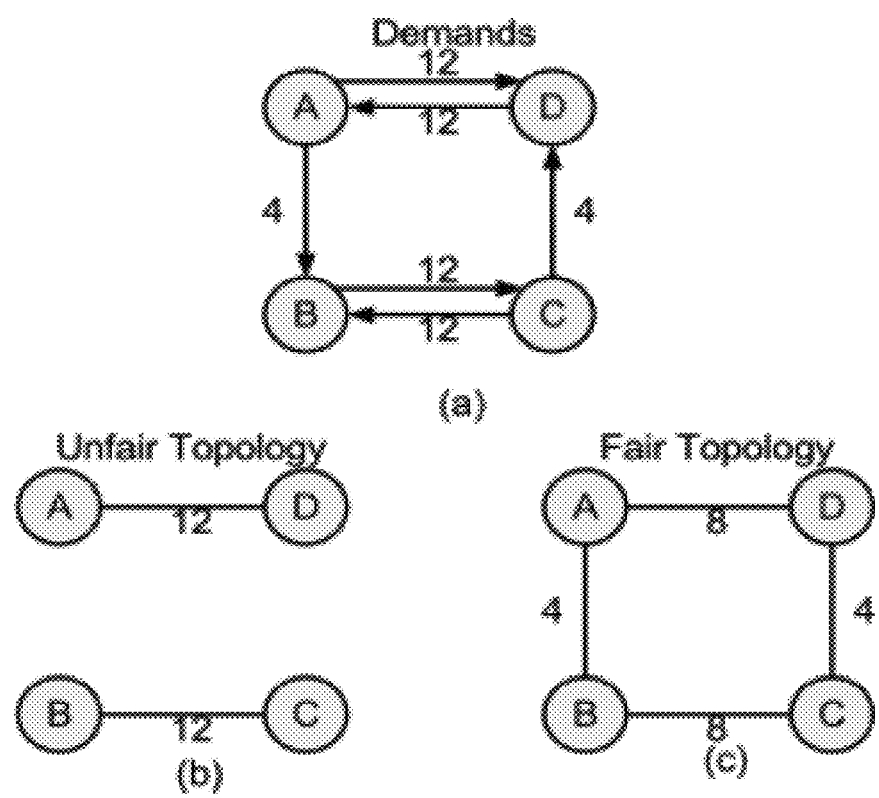
FIGS. 4-10 are schematic diagrams illustrating configuration of network topologies according to exemplary implementations.
Figure 5:
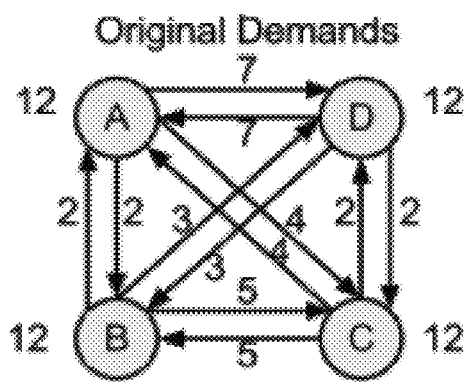
Figure 5:
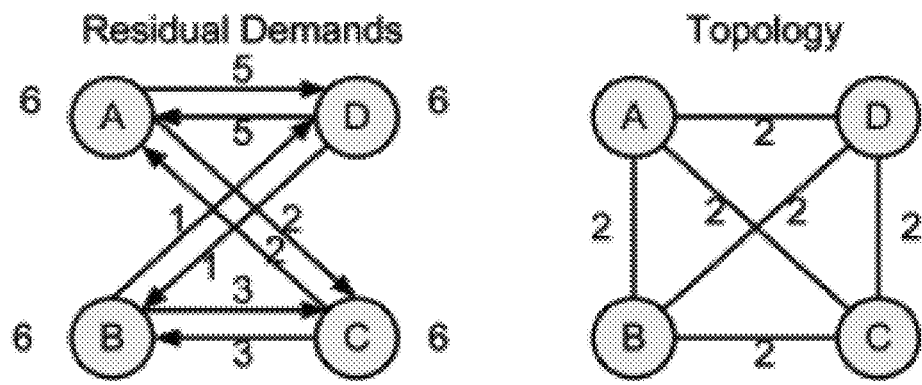
Figure 5:
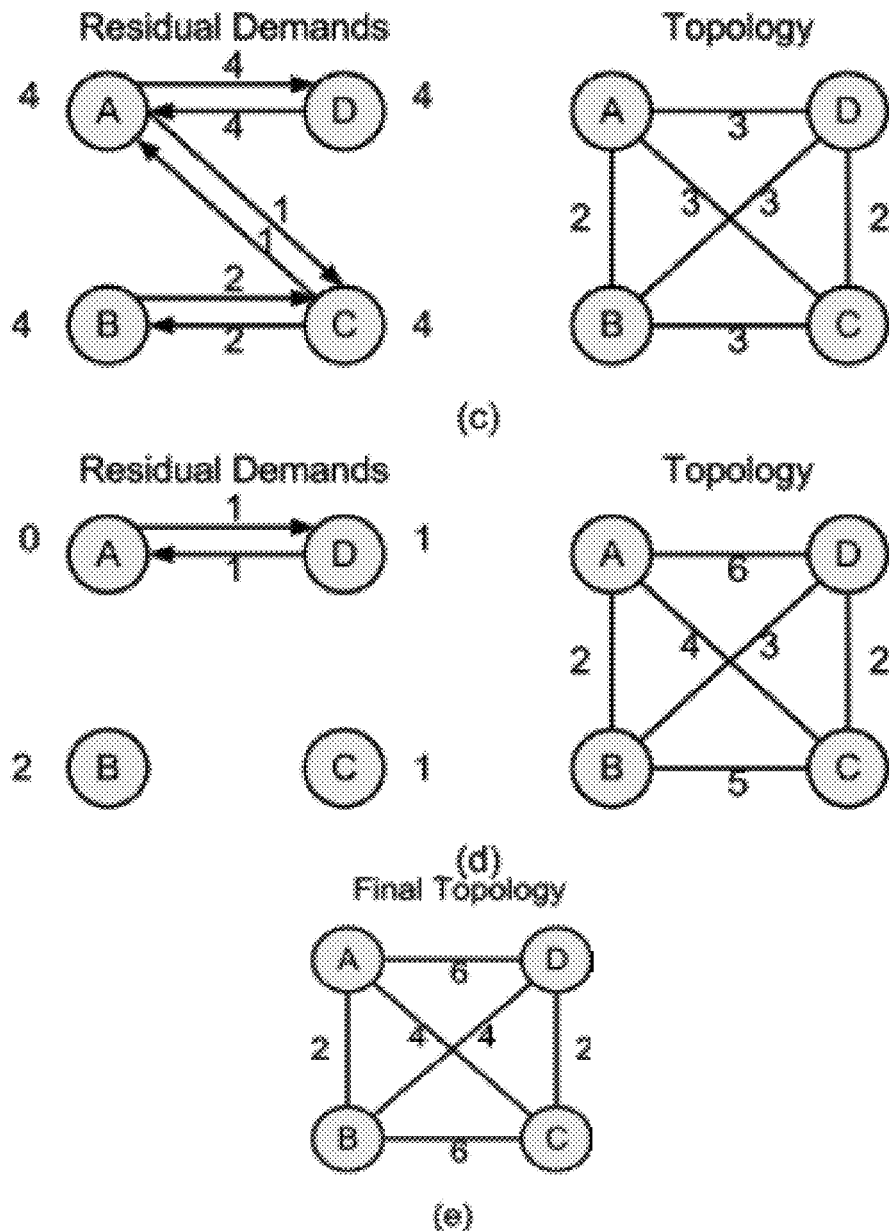

Examples of network topologies illustrating the concept of fairness introduced above are now discussed with reference to FIG. 4(a)-(c). FIG. 4(a) shows four 12-port nodes, labeled A through D, with the corresponding demands in each direction (normalized in terms of the port capacity). For example, node A has 12 ports and a demand to send 4 units to B and 12 units to D. In FIG. 4(b), an example network topology has been selected in which links are only assigned between nodes A and D and nodes B and C. The process of assigning links between nodes to satisfy the respective data transfer demands of the nodes is referred to as assigning links across those demands.

Figure 10:
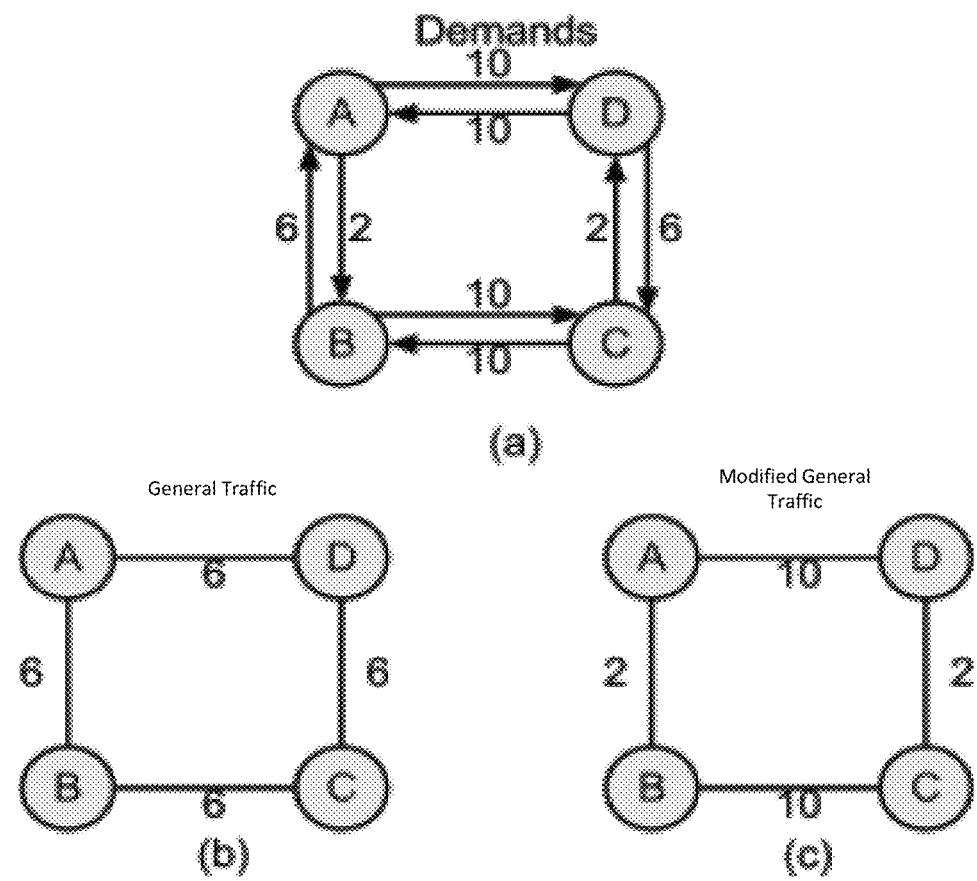

In FIG. 4(b), links have been assigned between each of the 12 ports in node A and each of the 12 ports in node D. Similarly, links have been assigned between each of the ports in node B and each of the ports in node C. Assignment of links in a network topology is discussed in greater detail below in the description of examples of network topology building. The topology of FIG. 4(b) meets 12 units of bi-directional demand between nodes A and B by assigning all 12 of node A's ports and all 12 of node B's ports to form 12 bi-directional links between nodes A and B. Similarly, all 12 of node B's and all 12 of node C's ports are assigned to form bi-directional links between nodes B and C. Accordingly, the total throughput of the topology shown in FIG. 4(b) equals 12*2*2=48. However, it does so at the expense of starving the demands A to B and C to D, that is, as shown in FIG. 4(b), no links are established between nodes A and B or C and D. Thus neither A's demand to send 4 units of data to node B or C's demand to send 4 units of data to node D are even partially satisfied. FIG. 4(c) shows a different example topology that leads to a more fair allocation by trading off some throughput (see also FIG. 10 for more details). The topology of FIG. 4(c) meets 8 units of bi-directional demand between nodes A and B by assigning 8 of node A's ports and 8 of node B's ports to form 8 bi-directional links between nodes A and B. Similarly, 8 of node B's and 8 of node C's ports are assigned to form bi-directional links between nodes B and C. In this case, 4 of node A's ports and 4 of node B's ports are assigned to form bi-directional links between nodes A and B, and 4 of node C's ports and 4 of node D's ports are assigned to form bi-directional links between nodes C and D. Accordingly, Here total throughput is only 8*2*2=32 on the A to D and B to C pathways, and the two additional 4-unit demands from A to B and from C to D are satisfied, for total throughput for the entire topology of 32+4+4=40.

One strategy for seeking a balanced network topology (i.e. more like FIG. 4(c) than like FIG. 4(b)) is known as "Max-Min Fairness," (MMF) which fulfills a strict fairness objective, but MMF can be challenging to achieve, in general, and MMF has in some cases been very complicated and time consuming to compute for multi-path environments in practice. This complication and time cost is in addition to the usually undesirably excessive throughput reduction tradeoff paid when using extreme fairness measures such as MMF. Accordingly, in some implementations, other approaches are utilized, such as increasing the overall network throughput subject to increasing the minimum throughput guarantee across all demands. Accordingly, some implementations utilize a series of heuristics that, by design, also reduce the overall inter-superblock switching latency.

The following sections briefly introduce notation and key concepts that will be used in describing various implementations.

Each superblock can be approximated by modeling all its top-tier chips as one node. In some implementations, each node has a constant degree (number of links connected to it), and its links are all of the same capacity. In other implementations, different nodes may have differing degrees and link capacities. A network topology configuration system 201 (see FIG. 2, discussed below) performs a series of processes for interconnecting all nodes with a different number of links based on an estimated inter-superblock traffic demand matrix.

In building a logical topology, a network topology configuration module 205 (see FIG. 2, discussed below) takes the traffic demand matrix M_D and a maximum hop count (maximum routing length allowed) as an input and returns a connectivity (topology) matrix M_T together with a routing matrix M_R. The (i,j)th entries in M_D, M_T, and M_R respectively denote the demand, number of links, and list of routes and the capacity allocated along each route between the $i^{th}$ and the $j^{th}$ superblocks. Each demand d in the demand matrix has two nodes associated with it, source node and a destination node (also referred to as left nodes and right nodes, respectively), and each node N has an associated number of unsatisfied demands and number of free ports, where a demand is considered to be unsatisfied if it has not been fully routed yet though there is still some capacity to route part or all of it. In other words, a demand is unsatisfied if each node on either side of the demand is either active or has links that have not been fully utilized yet. An "active node" is one which still has free ports and/or slack (unallocated capacity) on any of its connected ports.

Since the interconnect and routing instances jointly decide how far it is acceptable to be from an optimal solution, the network topology configuration module 205 employs heuristics such that striping and routing are jointly decided (instead of deciding on the two instances independently).

Figure 2:
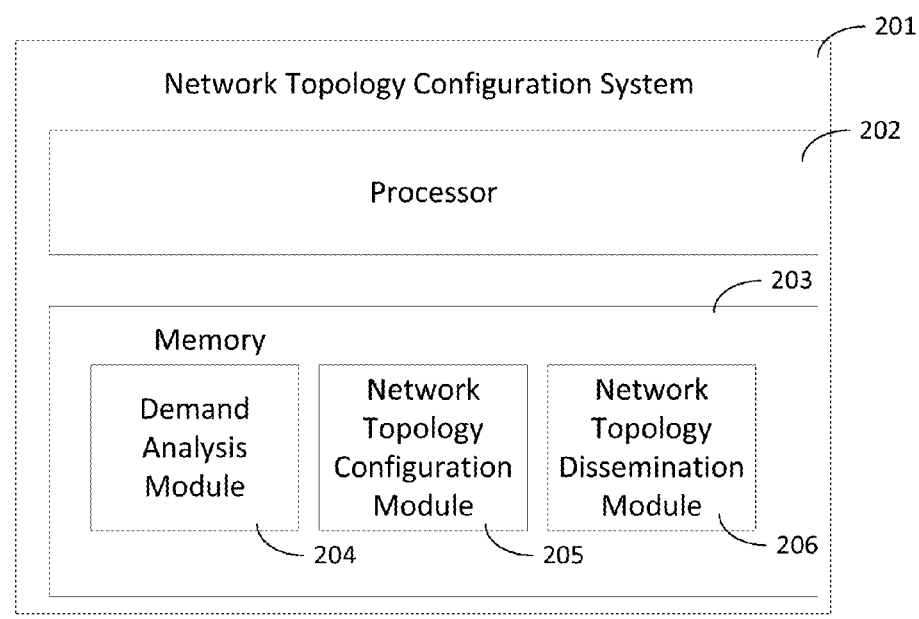
FIG. 2 is a system diagram depicting a network topology configuration system according to an exemplary implementation.

FIG. 2 is a system diagram depicting an example network topology configuration system 201 suitable for use in a data center. The network topology system includes a processor 202 and a memory 203. The processor and the memory interoperate to execute a number of modules in the network topology configuration system 201. More particularly, the memory stores a demand analysis module 204, a network topology configuration module 205, and a network topology dissemination module 206. The demand analysis module 204 gathers and processes demand information relating to demands between nodes in a network. A network topology configuration module 205 uses the demand information provided by the demand analysis module 204 to determine configuration information for a network topology to be implemented. A network topology dissemination module 206 receives the network topology information determined by the network topology configuration module 205 and causes the selected network topology to be implemented by the nodes in the datacenter 100. The operation of these modules is discussed in greater detail below.

I. Heuristic Network Topology Formulation

Figure 3:
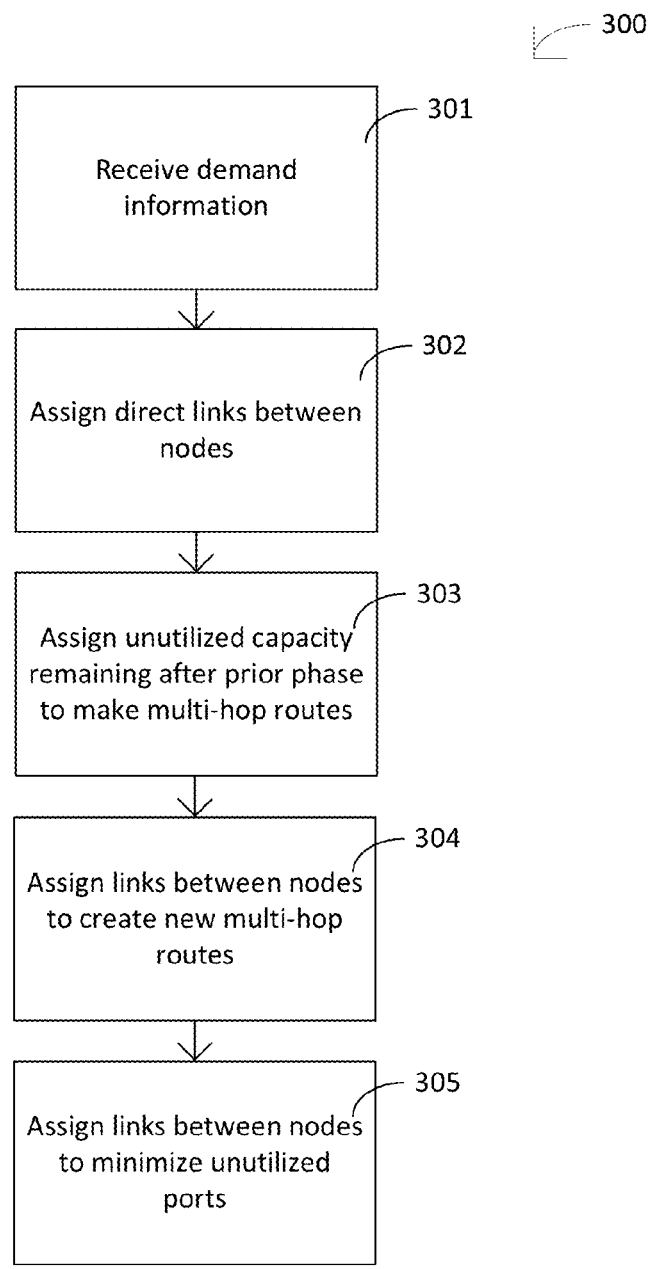
FIG. 3 is a flow chart depicting a process for configuring a network topology according to an exemplary implementation.

Configuration of a network topology according to an exemplary implementation will now be described with reference to FIG. 3. In a brief overview, a process of determining a network topology 300 includes obtaining demand information (phase 301), assigning direct links between nodes (phase 302), assigning unutilized capacity remaining on links assigned during the prior phase to make multi-hop routes (phase 303), assigning new links between nodes to create new multi-hop routes (phase 304) and assigning links between nodes to minimize unutilized ports (phase 305).

As set forth above, the topology determination process 300 begins with obtaining demand information (phase 301). In some implementations the demand analysis module 204 receives the demand information. In one implementation, the demand information is provided in the form of a demand matrix. The demand matrix is a square matrix in which the element of the demand matrix having coordinates x,y (where x and y are arbitrary integers between 1 and the order of the matrix, inclusive) represents the amount of traffic demand there is for data to be sent to node x from node y. In other implementations, the demand information can be received in other forms. For example, data encoding schemes may be employed to generate a demand data structure which includes only non-zero demands between nodes, e.g., in cases where a demand matrix would be especially sparse. The demand information may be derived by the demand analysis module 204 from observed data, such as prior data transfer rates over active links. The demand information also may be provided by an external source and received by the demand analysis module 204.

The process continues at phase 302, where the network topology configuration module 205 assigns direct (i.e., one-hop) links between nodes. Each port in a node can be assigned to be used in establishing a data link to another node. Once a link is established between a given pair of nodes, it is then available for use in transferring data in both directions between that pair of nodes. This data-transfer capacity is used to meet the capacity demands of the various nodes. Once a link is assigned, the network topology configuration module 205 also can assign one or more data routes utilizing the link. These include "direct routes," meaning that data resident at a first node is transferred over the link to a second node that also is the destination node. The routes also can include "multi-hop routes," in which data resident at a first node first traverses a link to a second node that is not the destination node, and then traverses one of more subsequent links until it reaches the destination node. In one implementation, the network topology configuration module 205 assigns direct links using a "water-filling" method (discussed in greater detail below) to create one-hop routes between the different nodes to satisfy their demands in a fair fashion. Typically, this process will leave some amount of each link's capacity unutilized. In other implementations, fairness considerations may be disregarded in favor of prioritizing direct links that satisfy bi-directional demands between a pair of nodes.

A water filling algorithm is a general name given to the ideas in communication systems design and practice for equalization strategies on communications channels. As the name suggests, just as water finds it level even when filled in one part of a vessel with multiple openings, the communications channels find even levels when filled with a water filling algorithm. In the implementations described here, the water filling algorithm is used to determine an order for allocating links in a fair fashion. The fair number of links allocated to any demand is the minimum of the actual demand value and the fair share of the demand of each of the two end nodes associated with the demand. More specifically, the fair share of a node is the number of ports of that node which have not been connected yet, divided by the total count of the node's total unsatisfied demands. If this division always yields an integer value, then this heuristic yields a MMF allocation that simultaneously maximizes throughput and reduces latency.

At every point during phase 302, and as long as there are still unsatisfied demands which can partially or fully go on direct single-link routes, one of the following three things happens:
(i) A demand is satisfied.
(ii) A node has no more ports available to connect to.
(iii) The number of ports n available at a node becomes less than the number of active nodes with unsatisfied demands to/from that node.

If case (iii) takes place, the network topology configuration module 205 allocates one link at a time to the highest unsatisfied demand that maps to such nodes, with preference to nodes with the fewest available ports, until there are no more such free ports. In other implementations the network topology configuration module 205 (i) can connect a node because of the slack (the unallocated capacity on one of the established links) it has to an inactive node (i.e. two-hop routing), and (ii) if the remaining demand d for one of the active nodes is less than the unit capacity of one port (i.e. d<1) and the remaining demand of another active node was greater than d+m, where m is an integer, the network topology configuration module 205 can connect m links across the higher demand.

Phase 302 ends once there are no demands with active nodes on both ends, i.e. once no more traffic demands can be allocated on direct routes. At this stage, the network topology configuration module 205 seeks to allocate the remaining links in a way that maximizes throughput (at phase 303), starting first by attempting to do this via 2-hop routes, then 3-hop routes, and so on.

The network topology configuration process 300 continues at phase 303, where the network topology configuration module 205 assigns unutilized capacity resulting from the link assignments in phase 302 to make multi-hop routes to satisfy remaining demands. To do so, the network topology configuration module 205 generates a slack subgraph, representing those instances where a bi-directional link was assigned between a pair of nodes, thus creating bi-directional data throughput capacity, but where the demand in one direction across the pair of nodes is greater than the demand in the other direction across the pair of nodes. These instances thus provide unutilized capacity between these pairs of nodes in one direction only. The network topology configuration module 205 processes the slack subgraph to determine what multi-hop data routes can be established between pairs of nodes utilizing the as-of-yet unutilized capacity. The network topology configuration module 205 establishes these data routes seeking to satisfy the maximum achievable demands by use of that subgraph, excluding any allocations exceeding m-hop routes, where m is a predetermined maximum route length. Before connecting any additional links to allocate traffic on m-hop routes, for any m, the network topology configuration module 205 starts by utilizing any existing m-hop routes with slack (unallocated capacity on an established link) on each of the m links. All routes considered prior to this stage were of fewer hops. In some implementations, allocating more capacity for the disadvantaged demands is prioritized.

After utilizing all existing slack routes, and still within phase 303, the network topology configuration module 205 reconsiders connecting links from nodes that are still active and that still have some unsatisfied demands. For each such node N, it checks whether connecting to another active node M (even if that other active node had no unsatisfied demands left) would lead to satisfying at least one of N's demands (partially or fully). It connects nodes N and M if they satisfy the highest amount of N's demand relative to all (N, M) combinations in (all active nodes with unsatisfied demands, all active nodes). After every link is connected, and before potentially allocating N's demands on it, it checks again whether the link added leads to a slack route. If so, it considers those shorter routes first (and those with the maximum slack among routes of the same length), and it allocates demands on these routes, reiterating until no more slack routes of length n or less are left. The network topology configuration module 205 iterates on this procedure, considering m-hop or shorter routes only, until there are no such N and M nodes left.

In other implementations, the network topology configuration module 205 considers adding a link between any pair of active nodes instead of restricting one of the two nodes to be active AND have at least one unsatisfied demand. The approach then is to have a subgraph of the connected links that contains all nodes and only those links with slack, and adding links that form edges in the subgraph so as to form a graph clique with all active nodes (i.e. all active nodes are interconnected directly via one link). Among all routes on the new graph, all routes that have two consecutive clique links connected through an active node with one free port are ignored (since these routes are not feasible). The network topology configuration module 205 allocates the maximum additional demands that can be routed across the route with the fewest number of clique links in it. In other implementations, the route with the highest ratio of a potentially satisfied demand to the number of clique links this demand could potentially consume is selected.

The phases described above can be represented by the following pseudocode:

Phase 302:
```
while (there are remaining unsatisfied demands) {
    among all such remaining unsatisfied demands d, find the
        value V of the minimum non-zero Fair_Share(d)
    for all demands d s.t. Fair_Share(d)=V:
    connect V links across d and update the value of the
        demands, free_ports, number_of_unsatisfied_demands,
        and status of the node (active or not)
    //In other implementations, the while loop below is moved
        outside the outer while loop while (there is a node N s.t.
        N.free_ports<N.number_of_unsatisfied_demands):
        pick the highest such demand in the network (with pref-
            erence to a node N with the minimum N.free_ports
            value in case of ties) and connect it to one such free
            port, while ensuring that this demand doesn't get
            another such link assignment later on.
}
Fair_share(demand) {
    R=demand.right_node;
    L=demand.left_node;
    return min(floor(demand), floor(R.free_ports/R.number_of_unsatisfied_demands), floor(L.free_ports/L.number_of_unsatisfied_demands))
}
```

Phase 303:
```
hop_count=2
while (hop_count<max_hop_count && there are still unsatisfied demands with an active node) {
    Utilize_existing_links( );
    while there are (N, M) combinations E (all active nodes
        with unsatisfied demands, all active nodes) s.t. adding a
        link between them can partially or fully satisfy a demand
        with routes of length less than or equal to hop_count {
        connect the (N, M) pair that satisfies the most of N's
            demand
        Utilize_existing_links( );
    }
    hop_count++;
}
```

The process then continues at phase 304, where the network topology configuration module 205 assigns new links between nodes to create new multi-hop routes.

If there are still active nodes, the network topology configuration module 205 connects them in a way where floating wires are avoided when possible (i.e. no nodes are left with free ports). An algorithm which the network topology configuration module 205 uses to performs this assignment of free ports is described immediately below.

The algorithm operates by iteration over its phases of operation. The set of nodes with the highest remaining free port count is denoted by M. The set of nodes with the next largest free port count thereafter is denoted by M'. If |M|==1 (i.e., there is only a single node in the set M), the single node in M connects its ports with the nodes in the set M' in a water filling fashion until any node in M' ends up with the same count of free ports as another node outside this set. If |M|!=1, the nodes in the set M are interconnected in a quasi-even way such that each node ends up having as many as or one fewer free port than all nodes in M'.

The process continues at phase 305, where the network topology configuration module 205 assigns links between nodes to reduce or minimize unutilized ports. At this point, no further demands can be satisfied, but there may be remaining capacity at certain nodes that has not yet been assigned. Accordingly, the network topology configuration module 205 assigns links between nodes having excess capacity until no further capacity can be added to the network topology. Accordingly, if demand exceeds what is expected between nodes connected by these additional links, that demand can be satisfied as well, even though it was not factored in to the original design of the network topology. In order to make the efficient use of potential capacity, these additional links are established so as to reduce or in some cases minimize the number of unutilized ports. Accordingly, nodes having more unutilized ports are first in line to have links established.

Several examples illustrating the application of the above-described process are described below.

Examples 1-3

Symmetric Bi-Directional Traffic

In a simplified example, the traffic demands between any two superblocks i and j are bi-directionally symmetric. This simplified situation is unlikely to be the case in reality, but it is discussed here first for illustrative purposes in describing the operation of network topology configuration module 205. This symmetry simplifies the situation in that any connected link will be either fully utilized or will have the same slack in both directions.

As indicated above, the illustrative topology determination process 300 includes three phases. In the first phase 302, the network topology configuration module 205 assigns links by "water filling" links as direct one-hop routes across the different demands in a fair fashion. Once there are no more direct routes to be established, the network topology configuration module 205 starts the second phase 303, in which it connects the remaining links in a multi-hop fashion that heuristically maximizes throughput. In the third phase 304, the network topology configuration module 205 interconnects nodes that still have free ports.

Example 1

An exemplary operation of the procedure discussed above for configuring a network topology is now discussed with reference to FIG. 3 and FIG. 5(a)-(e).

As indicated above, the topology determination process 300 begins with the demand analysis module 204 obtaining demand information in phase 301. The demand information is shown in FIG. 5(a), where each node has the number of free ports noted next to it. For example, nodes A and B each have 12 free ports. Arrows in the diagram are labeled with numbers and represent demands. For example, there is a demand of 2 units from node A to node B, and there is a demand of 2 units from node B to node A. Similarly, the demands between nodes A and D are 7 units in both directions. The demands between nodes A and C are 4 in both directions. The demands between nodes B and C are 5 in both directions. The demands between nodes B and D are 3 in both directions. The demands between nodes C and D are 2 in both directions.

The water-filling process described above with respect to phase 302 results in the network topology configuration module 205 assigning two links between each node pair, thus satisfying the (A<->B) and (C<->D) demands as shown in FIG. 5(b). In the left half of this Figure, which shows residual demands waiting to be satisfied, the demands shown in FIG. 5(a) have all been reduced by 2, which also eliminated the demands between A and B and between D and C. Now A and D have demands of 5 each way, A and C and demands of 2, etc. The remaining numbers of available ports also have been reduced. Each of nodes A, B, C and D now have 6 remaining unused ports. For example, node A has 2 links assigned to each of nodes B, C and D, for a total of 6 of 12 ports used, leaving 6 more.

The right half of FIG. 5(c) shows the state of the network topology after completion of the water-filling process. As indicated above, each potential node-to-node pathway has been assigned to have 2 links. Still in phase 302, the network topology configuration module 205 allocates one extra link between the other node pairs excluding the pairs (A, B) and (C, D), thereby satisfying the (B<->D) demand (See FIG. 5(c)).

Having evenly allocated links across paths having unsatisfied demands to the maximum extent in FIG. 5(b), in FIG. 5(c) the process has reset by equally distributing links to those node-to-node pathways still having unsatisfied demands. Thus the left half of FIG. 5(c) shows that the residual demands have all been reduced by one relative to FIG. 5(b), and each assigned link has been reflected in the topology graph on the right side of FIG. 5(c). Thus the A to D path, the A to C path, the B to D path and the B to C path now have 3 assigned links instead of the two they had in FIG. 5(b), while the A to B and D to C paths remain unchanged at 2 assigned links.

The network topology configuration module 205 proceeds, still in phase 302, by sequentially allocating one link between the remaining pairs until no more direct routes can be established for satisfying more demands (See FIG. 5(d)). Having this time eliminated the remaining demands on the B to D pathway, the process once again restarts by assigning links evenly across the three remaining pathways with unsatisfied demands, namely A to D, A to C and B to C. This iteration is allowed to continue further, by first eliminating all unsatisfied demands on the A to C pathway, then on the B to C pathway, and then eliminating 3 of the remaining 4 units of demand on the A to D pathway. The only remaining unsatisfied demands are reflected by the arrows between nodes A and D in the left side of FIG. 5(d), which indicate that there is 1 unit of demand remaining in each direction. Each of the links assigned since FIG. 5(c) has been reflected in the network topology in the right side of FIG. 5(d) (e.g., A to D has 6 assigned links now).

It happens in this case that the remaining demand between A and D cannot be satisfied in a multi-hop fashion, because all 12 ports of node A have already been assigned, and thus no further data pathways into or out of node A can be created. Phases 303 and 304 therefore do not result in any changes to the network topology that is being configured. A is thus no longer an active node, but there are 4 remaining open ports for the three remaining active nodes (B has 2, while C and D have 1, as shown in FIG. 5(d)).

While no further demands can be satisfied, the network topology configuration module 205 nevertheless continues to perform phase 305 because it can increase total network capacity by connecting one of B's free ports to C and the other to D. This results in all ports being used and no remaining active nodes. Note that if instead C's free port had been connected to D's, there would have ended up being two free ports on B that are not utilized, because they would have nothing to which to connect. This is undesirable, because it means there is potential data capacity that is not being used. Thus the configuration is used that reduces the number of "loose wires," i.e., unassigned ports. Having assigned the links between B and D, and between B and C, the topology is updated to its final configuration, shown in FIG. 5(e), where there are now 4 links between B and D and 6 links between B and C as a result of the last links being added since FIG. 5(d).

Example 2

Figure 6:
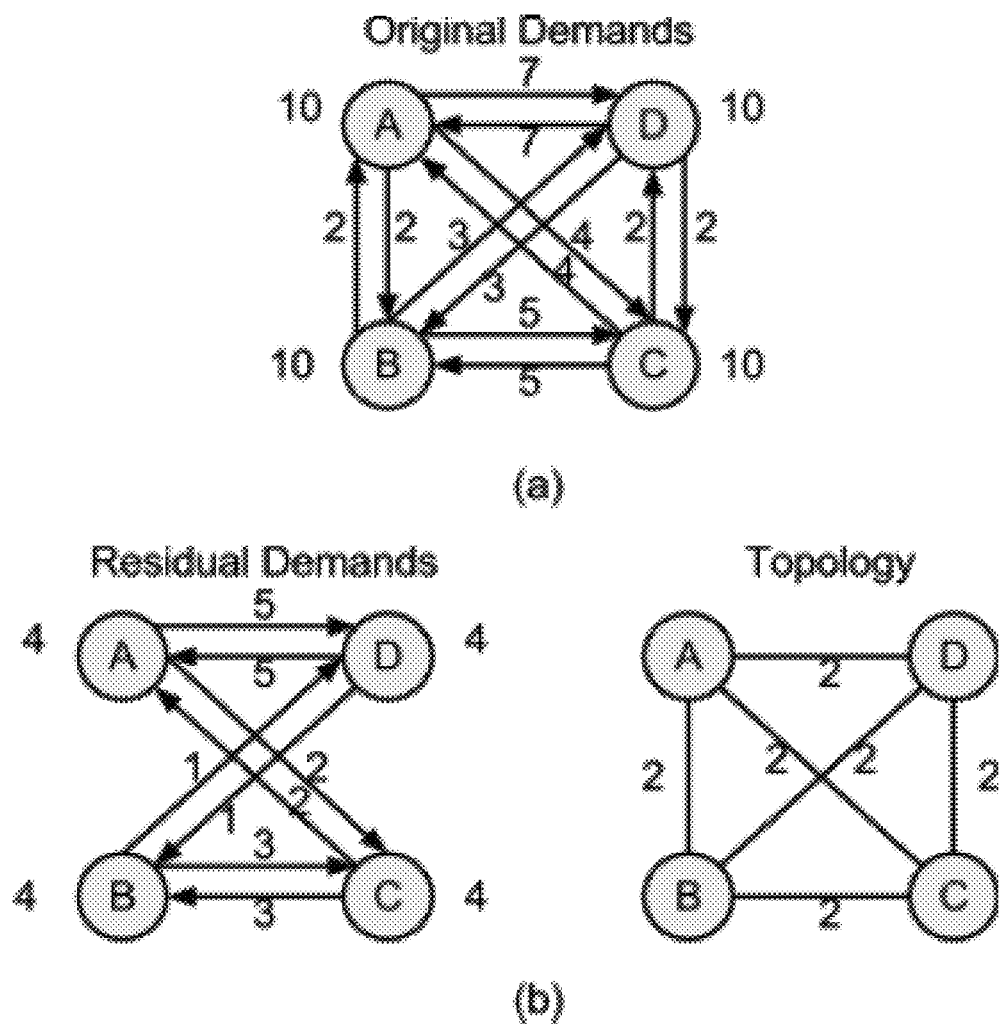
Figure 6:
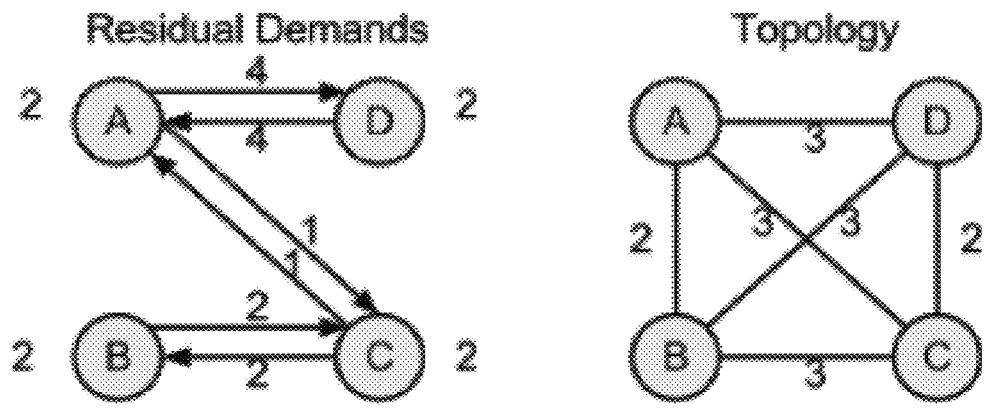
Figure 6:
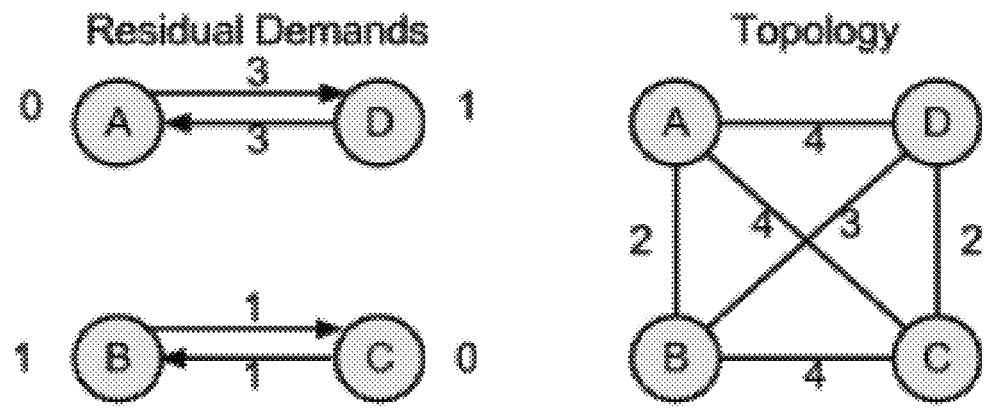
Figure 6:
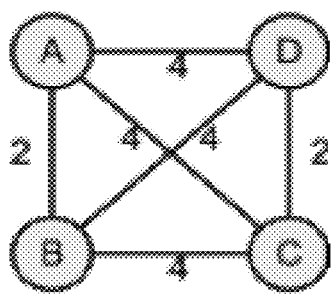

Operation of the procedure described above for configuring a network topology is now discussed with reference to FIG. 3 and FIG. 6(a)-(e). Similarly to the actions demonstrated with reference to FIG. 5 above, the progression is illustrated as the new topology is being computed. FIG. 6(a) shows that the demands in this example are the same as in the example of FIG. 5, but in this example each node has only 10 ports instead of 12. FIGS. 6(b) and 6(c) show the topology building beginning in the same fashion as in FIGS. 5(b) and 5(c). In proceeding from there, however, Phase 302 bottoms out and completes at the intermediate state shown in FIG. 6(d), where a residual bi-directional demand of 3 exists between nodes A and D, and a demand of 1 is still unmet between B and C. Nodes A and C are no longer active, as they have already assigned all of their ports, and it happens that there are no unsatisfied demands that can be allocated multi-hop, so the network topology configuration module 205 proceeds immediately to Phase 304 and connects the two remaining free ports to add one last link between nodes B and D, resulting in the final topology shown in FIG. 6(e).

Example 3

Figure 7:
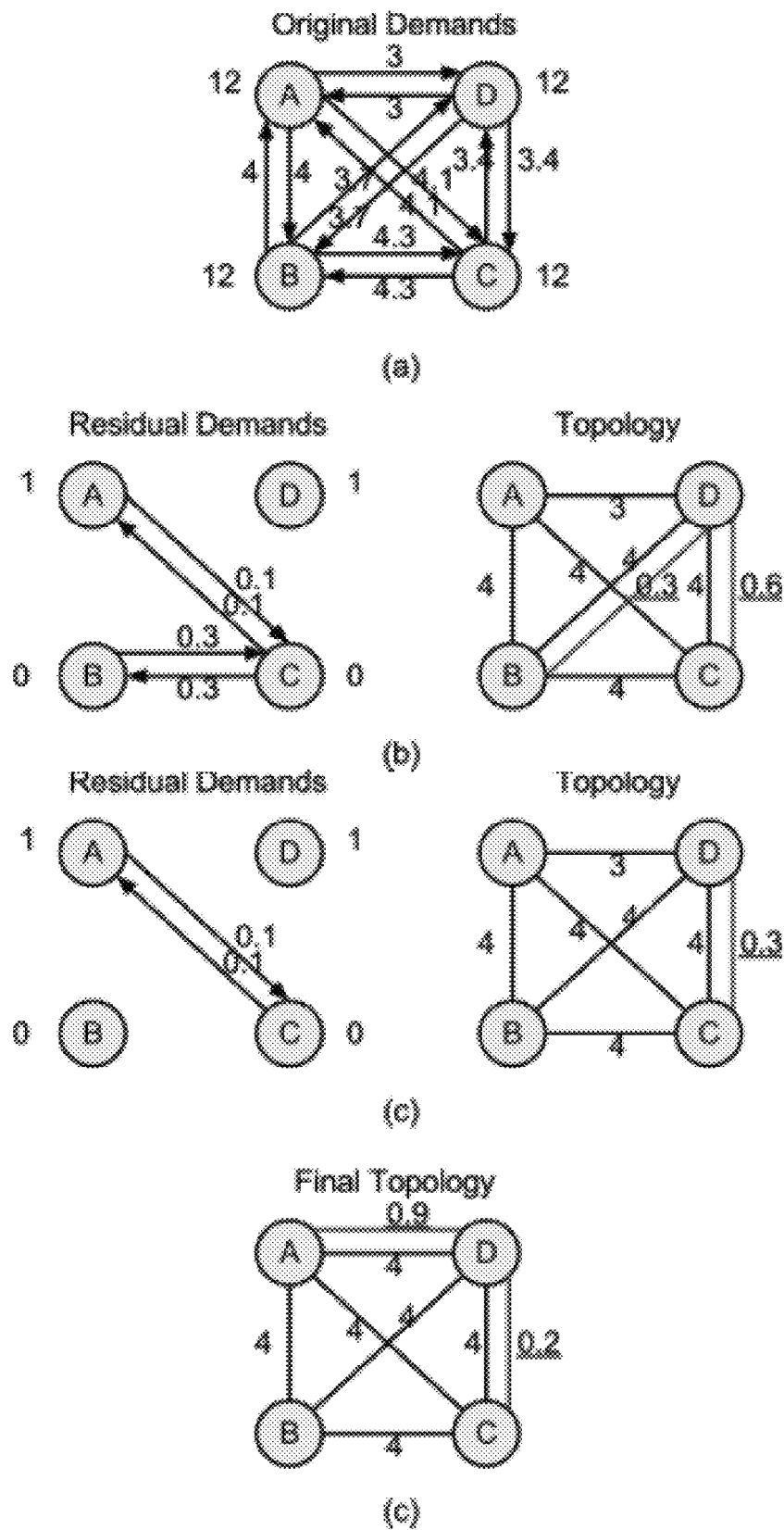

A further example of operation of the procedure described above for configuring a network topology is now discussed with reference to FIG. 3 and FIG. 7(a)-(c). FIG. 7 shows an example that emphasizes Phase 303. Beginning at FIG. 7(a), the network topology configuration module 205 receives demand information that in this case includes fractional demands. For example, the demand between C and D is 3.4 in both directions, and the demand between B and C is 4.3 in both directions. All demands are equal in both directions in this example, as was the case in the examples discussed so far. FIG. 7(b) shows the topology (with the slack capacity shown on a parallel line with its underlined value) and residual demands by the end of Phase 302, where no more one-hop routes can be established to satisfy the residual demands. All node-to-node pathways have been assigned 4 links, except for the A to D pathway which has 3. There is 0.3 slack capacity in both directions between nodes B and D, due to the addition of 4 links where there was only 3.7 demand. While it may be possible to route additional data across this slack capacity, links may only be added in whole number increments, leading to such situations of slack capacity. Similarly, the C to D pathway has 0.6 slack capacity in both directions after assigning 4 links against 3.4 demand. In Phase 303, the network topology configuration module 205 begins by utilizing the available slack, before connecting any additional links, to satisfy the (B<->C) demand as shown in FIG. 7(c). Thus the network topology configuration module 205 can assign a 2-hop data route from node B to D to C for a capacity of 0.3, utilizing the existing slack paths shown in the right side of FIG. 7(b), and thereby satisfying the remaining demand from B to C. This consumes all of the slack capacity from B and D, and half of the slack capacity from C to D. Thus the topology diagram in FIG. 7(c) only has slack indicated between C and D in the amount of 0.3. Since no more demands may be routed via the slack left after this stage, the network topology configuration module 205 proceeds to the second part of phase 303 and connects the last remaining open ports to form link (A, D) for 2-hop routing. Thus the (A<->C) demand is bi-directionally routed on the (A, D, C) path). This consumes 0.1 of the slack capacity between C and D, leaving 0.2 in the final topology shown in FIG. 7(c). Similarly, only 0.1 is being routed over the A to D link, thus 0.9 slack capacity is indicated there.

Examples 4-5

General Traffic

Here and subsequently, examples are described illustrating the more general case when traffic demands are not symmetric. First, a brief comparison is given noting general similarities and differences between the operation of the phases of operation of the network topology configuration module in these examples relative to the operation in the previous examples.

In implementations where traffic demands are not symmetric, the network topology configuration module 205 starts by fairly allocating one hop routes for all demands just as it did in Phase 302 as described above in the implementation with symmetric bi-directional traffic. Hence, the network topology configuration module 205 can replace the bi-directional demand value by max(M_D[i][j], M_D[j][i]), and the number of demands per each node N with the number of all demands that involve N as the sending or receiving node (without double-counting).

In contrast to the description of the first phase above, when dealing with the general traffic scenario, the first phase ends once there are no demands left with active nodes on both ends, i.e. once no more traffic demands can be allocated on direct routes. At this stage, the network topology configuration module 205 utilizes any already existing multi-hop routes (starting with the shortest ones as in the symmetric case) with slack on all hops. Given all available slack multi-hop routes of the same length (i.e. starting with 2 and up to n), the network topology configuration module 205 considers all the demands that can benefit from these multi-hop routes starting with the most disadvantaged demands. Once the network topology configuration module 205 has satisfied all disadvantaged demands, it divides any remaining multi-hop slack evenly across all demands going over it.

In the general traffic scenario, as the network topology configuration module 205 starts the second phase with no n-hop routes with slack, as such routes were assigned in the previous phase as described above, it considers adding new links that would lead to the creation of new n-hop routes with slack, just like in the latter part of Phase 303 of the symmetric traffic case discussed above. The slack would also be divided evenly across all demands sharing the new route. Once the network topology configuration module 205 can add no more links that lead to n-hop slack routes which the remaining demands can still be routed over, it iterates back to the previous phase with a larger n.

In the general traffic scenario, if there are still active nodes, the network topology configuration module 205 connects them in a way where floating wires are avoided where possible (i.e. it seeks to leave no nodes with free ports) as described above in relation to the symmetric case above.

Example 4

Figure 8:
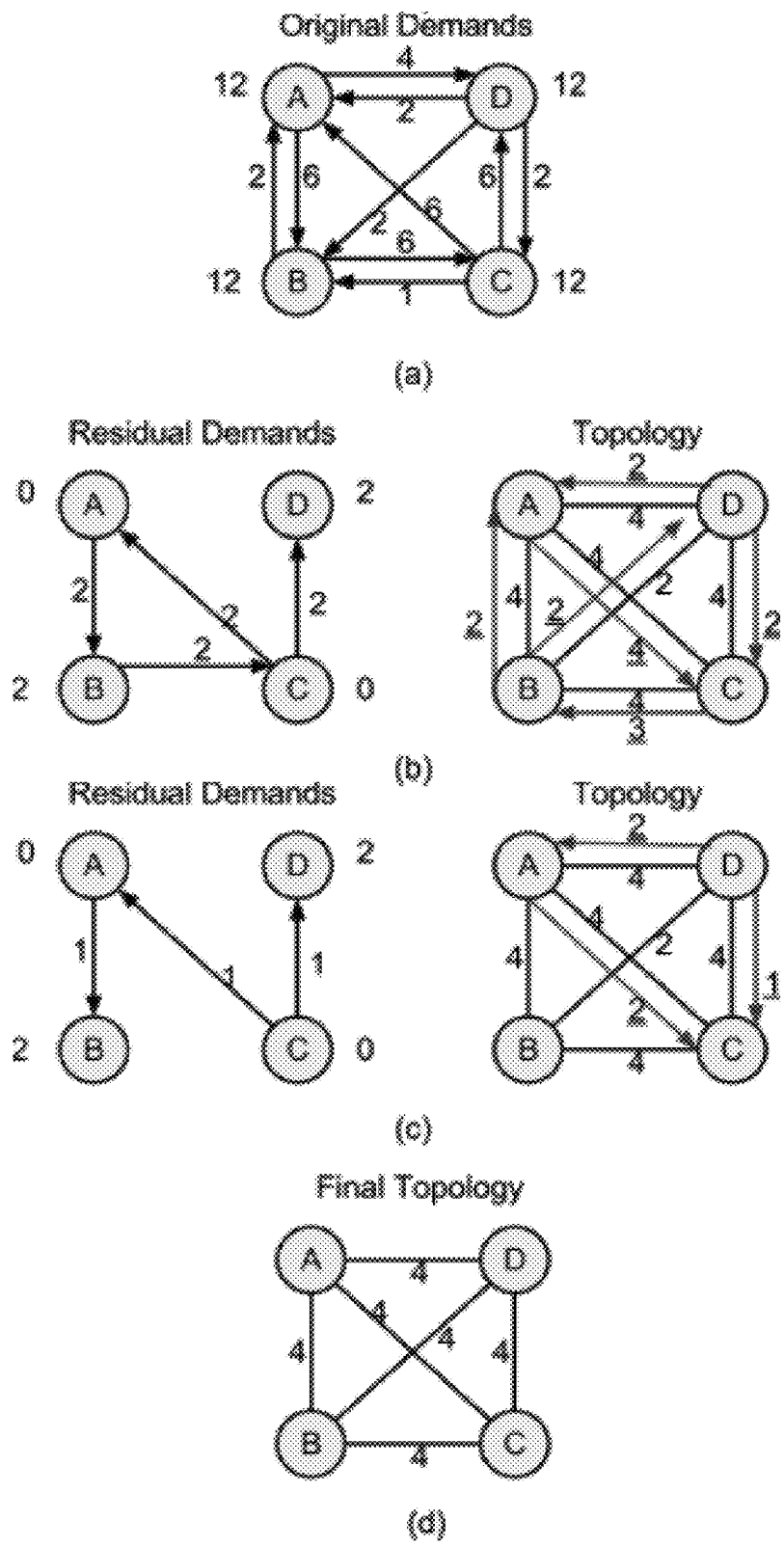
Figure 9:
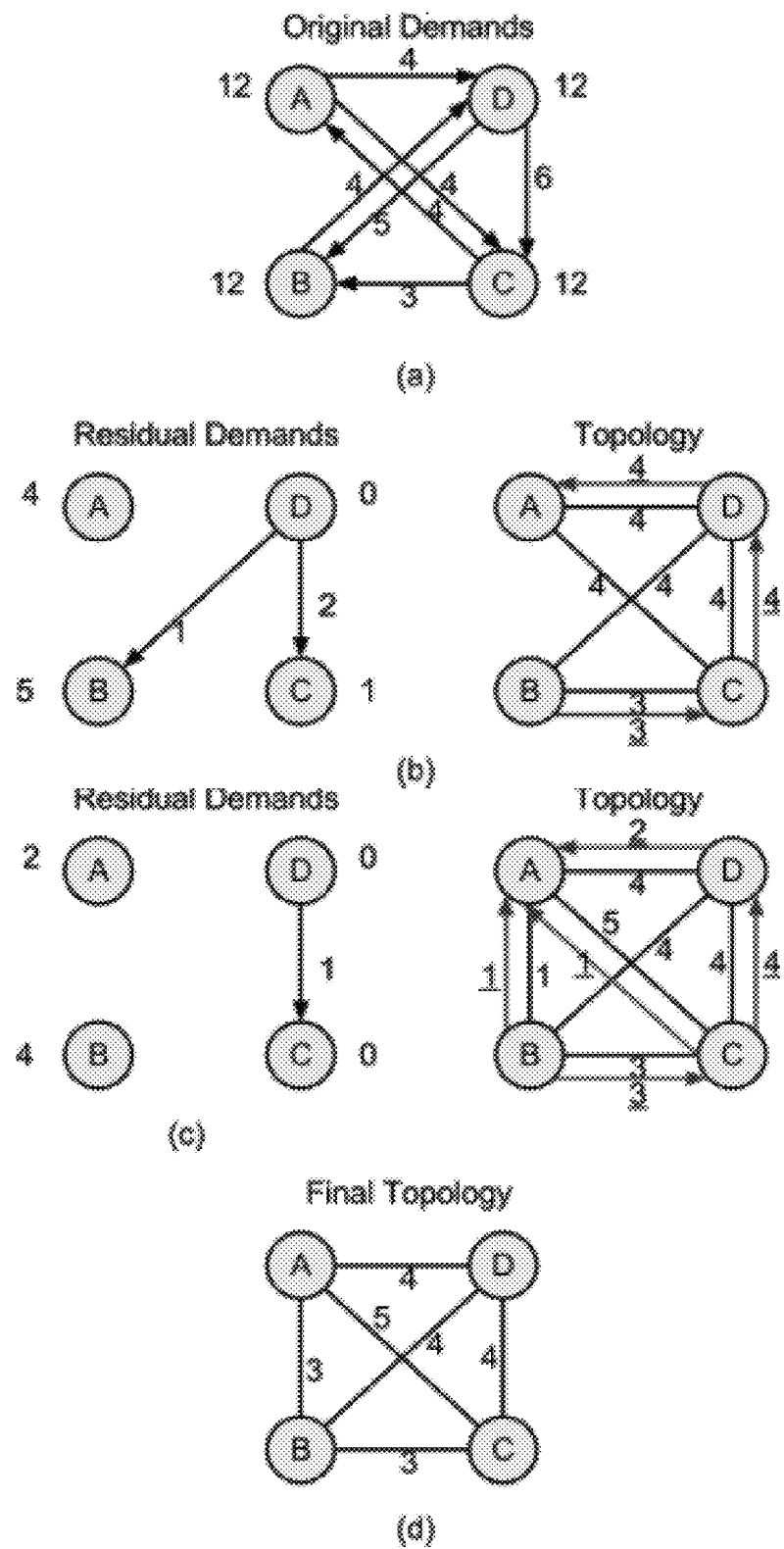

Operation of the procedure described above for configuring a network topology for general traffic is now discussed with reference to FIG. 3 and FIG. 8(a)-(d). FIG. 8(a) shows nodes with 12 ports each, and non-symmetric demands between nodes. For example, the demand from A to D is 4, but there is only a 2-unit demand in the opposite direction. Similarly, there are only demands in one direction from C to A (6 units) and from D to B (2 units). Similarly to the operation of Phase 302 in the symmetric case, the first phase with general traffic assigns direct links fairly and terminates with the topology, residual demands, and slack shown in FIG. 8(b). The slack paths shown in the right side of FIG. 8(b) here are all one-directional, as indicated by the arrows. For example, there is slack capacity of 2 from D to A, but no slack capacity from A to D. Four bi-directional links have been assigned to the A to D pathway, satisfying the 4 units of demand from A to D and the 2 units of demand from D to A, with 2 units of slack left over. At this stage, each of the four unsatisfied demands shown in the left side of FIG. 8(b) can have at least one unit routable via the slack capacity. In particular, the slack routing instance that fairly maximizes the amount of routable throughput is the following:

A→B demand: route one unit on A→C→B
B→C demand: route one unit on B→A→C and another on B→D→C
C→A demand: route one unit on C→B→A
C→D demand: route one unit on C→B→D With the slack routing described above, this phase terminates with the topology shown in FIG. 8(c). In this example, no more of the residual demands shown on the left in FIG. 8(c) can be routed by connecting more links. Only B to D links are possible as A and C have no more ports open (though A and C are still referred to as "active," because they have at least some remaining slack capacity), so this phase makes no changes to the network topology configuration, and the network topology configuration module 205 performs the final phase to connect the free ports via two (B, D) links, leading to the final topology shown in FIG. 8(d).

Example 5

Operation of the procedure described above for configuring a network topology is now discussed with reference to FIG. 3 and FIG. 9(a)-(d). This example emphasizes the operation of the third phase. Topology building begins as in the previous examples by assigning direct links based on the demands shown in FIG. 9(a). After the first phase terminates (FIG. 9(b)) when node D has no more open ports to form links to satisfy its remaining demands, the next phase terminates since the unsatisfied demands cannot be routed over the existing slack capacity. In the next phase (FIG. 9(c)), the network topology configuration module 205 connects links (A, B) and (A, C) to route one unit of (D→B)'s and (D→C)'s demands respectively. This corresponds to all 2-hop routes that could be utilized per those demands. It reiterates over the third phase to allow 3-hop routing (since no 3-hop routing can be accomplished via slack links per the previous phase), and it connects another (A, B) link to route the remaining (D→C) demand via the route D→A→B→C. In the final phase the network topology configuration module 205 then connects a third (A, B) link leading to the final topology in FIG. 9(d).

Example 6

General Traffic—Giving Up Some Fairness for Higher Throughput Guarantees

An example is now described illustrating an implementation in which the network topology configuration module 205 operates generally as in the general traffic case above, but it trades off some fairness in the interest of higher throughput by allocating any links that would be bi-directionally utilized (i.e. more efficient usage of resources) regardless of how unfair this could be. First, a brief comparison is given noting general similarities and differences between the operation of the phases of operation of the network topology configuration module in this example relative to the operation in the previous examples.

In this scenario, in the first phase, the network topology configuration module 205 allocates direct, one-hop routes that will be bi-directionally utilized as in Phase 302 of the symmetric case. Hence, it replaces the bi-directional demand value by min(M_D[i][j], M_D[j][i]), and the number of demands per each node N with the number of all bi-directional demands (though essentially having asymmetric values) that involve N (without double-counting). When there are no links left that could be bi-directionally utilized for single-hop routes, the network topology configuration module 205 proceeds by allocating links that will be utilized in one direction only (i.e. as far as single-hop routes are concerned during this stage, but the slack in the other direction is targeted in the next phases). This phase proceeds similarly to phase 302 of the general traffic case.

At the second phase in this scenario, the network topology configuration module 205 uses multi-hop routing to satisfy more demands. This is the same as Phase 303 in the general traffic case, where multi-hop slack routing over links already connected is used to maximize throughput (across the shortest routes with available slack and gradually going up in hop-count).

The next phase in this case is the same as Phase 304 in the general traffic case, adding new links for multi-hop routing and iterating back to the previous phase. Similarly, the next phase is the same as Phase 305 in the general traffic case.

Example 6

Operation of the procedure described above for configuring a network topology is now discussed with reference to FIG. 3 and FIG. 10(a)-(c). This example highlights the difference between the general traffic case and the modified general traffic case just discussed in terms of the fairness-throughput tradeoff given the same demands (See FIG. 10(a)). An initial set of demands is shown in FIG. 10(a), where A and D, and B and C have 10 units of bi-directional demand, while the A to B and D to C pathways have 6 demand in one direction, but only 2 in the reverse direction. The initial number of ports (not shown) is 12. According to the previously discussed examples, fair assignment of links would lead to the final topology shown in FIG. 10(b), with 6 links from A to D, D to C, C to B and B to A. The present example, however, which prioritizes satisfying bi-directional demand, looks very different, however. After initially assigning 2 links to each of the four relevant pathways, unsatisfied bi-directional demand only remains between A and D and between B and C, which are thus prioritized. This leads to the final topology shown in FIG. 10(c), where all 10 demand units are satisfied at the expense of four uni-directional demands from B to A and from D to C that are not met. Whereas the total throughput in the general traffic case is 40 compared to 48 in the modified general traffic case, the allocation in the general traffic case is more fair (it coincides with MMF in this case). This means that in practice, if A, for example, was to expect synchronized responses back from B and C (as might be the case, e.g., in the reduce phase in MapReduce), then the overall completion time in the general traffic case's topology would be faster. However, if different flows between different node pairs are independent, then the general traffic case's topology would yield less throughput.

II. Network Topology Configuration Using Linear Programming

As was discussed above, determining a network topology that balances fairness and throughput considerations presents various computational and logistical difficulties. In some implementations, the network topology configuration module 205 addresses some of these difficulties by representing the task in terms of conditions and constraints suitable for solving with a linear program.

Figure 11:
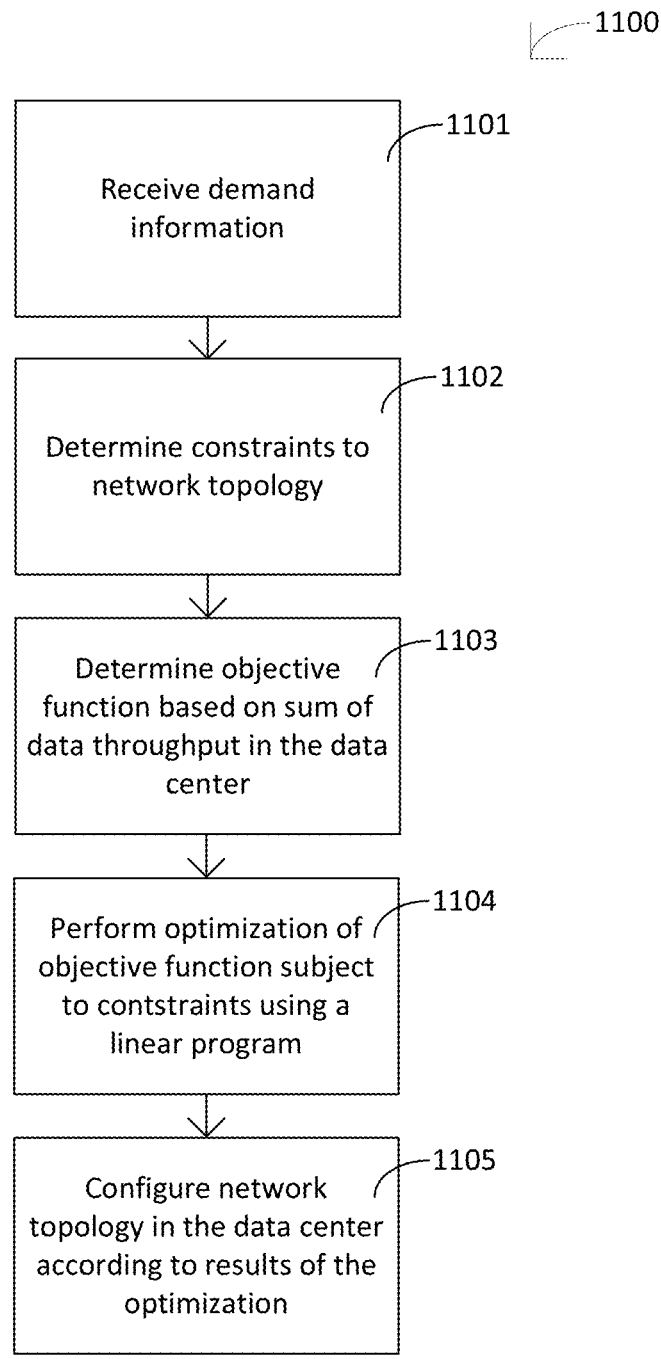
FIG. 11 is a flow chart depicting a process for configuring a network topology according to an exemplary implementation.

Configuration of a network topology according to another exemplary implementation will now be described with reference to FIG. 11. In a brief overview, a process 1100 of determining a network topology includes obtaining demand information (phase 1101), determining constraints to the network topology (phase 1102), determining an objective function based on a sum of the data throughput in the datacenter (phase 1103), performing an optimization of the objective function subject to constraints using a linear program (phase 1104), and configuring a network topology in the datacenter according to results of the optimization (phase 1105). As set forth above, the topology determination process 1100 begins with obtaining demand information at the demand reception module 204 (phase 1101). In one implementation, the demand information is provided in the form of a demand matrix. The demand matrix is a square matrix wherein the element of the demand matrix having coordinates x,y (where x and y are arbitrary integers between 1 and the order of the matrix, inclusive) represents the demand by node x from node y. Further implementations are possible, as well. For example, data encoding schemes may be employed to represent only non-zero demands between nodes, e.g., in cases where a demand matrix would be especially sparse.

The process continues at phase 1102, where the network topology configuration module 205 determines constraints to the network topology. The network topology configuration module provides the constraints determined at this phase in a form suitable for use in a linear program for performing an optimization. Exemplary constraints include: 1) traffic routed from node x to node y is not more than the demand from node x to node y, 2) the traffic routed does not exceed link capacities of the data center, 3) the aggregate capacity of links from and/or to a node is bounded (e.g., in the examples shown in FIGS. 4-10, no node can support more than 12 links, and no more than 10 in the case of FIGS. 6), and 4) flows between a source and a destination are preserved across all nodes traversed other than the source and destination nodes. In one implementation, the network topology configuration module also constrains the network topology to the use of only 1)

direct links between nodes and 2) two-hop routes between nodes. In other implementations, however, a different maximum number of hops may be enforced, such as 3, 4, 5 or a higher number as appropriate. In still other implementations, there is no maximum number of hops.

The process continues at phase 1103, where the network topology configuration module 205 determines an objective function based on a sum of the total data throughput in the data center. In one implementation, the network topology configuration module 205 determines the objective function to be the sum of: 1) a minimum throughput allocated across each demand, which provides a measure of fairness, and 2) a sum of data throughput across the direct links and two-hop routes in the data center (normalized by multiplying it by a very small predetermined constant). In other implementations, the total throughput may be used as the objective function, without the use of the fairness condition. In yet other implementations, the objective function may instead include the throughput which is guaranteed to be simultaneously satisfied per each demand.

The process continues at phase 1104, where the network topology configuration module 205 performs an optimization on the objective function subject to the constraints, using a linear program. In one implementation, the optimization is maximization, while other implementations may instead perform a minimization of the objective function. The network topology configuration module 205 performs the linear program using a custom-designed software implementation. Numerous off-the-shelf linear programming solvers may be used in other implementations. In one implementation, the linear programming tool may comprise Microsoft Solver (available from Microsoft). Numerous other commercial or free open-source software applications exist for solving linear programming optimization problems, including OpenOpt (available at openopt.org), LP_Solve (available at sourceforge.net), CPLEX (available from IBM), MATLAB (available from MathWorks) and Mathematica (available from Wolfram Research of Champaign, Ill.). A linear programming software application may be chosen, e.g., based on what APIs it supports, what operating system platforms it supports, whether it supports mixed-integer optimization, and so on.

The process continues at phase 1105, where the network topology dissemination module 206 configures the network topology in the data center according to the results of the optimization. The results of the optimization include a description of links to be established between particular pairs of nodes and data routes to be established between nodes across those links. These results are stored in one or more matrices (e.g., a routing matrix and a connectivity matrix, as discussed above) describing the universe of data links and data routes to be employed. The network topology dissemination module dynamically updates the network topology according to the results of the optimization. Further optimizations are then calculated and implemented on an ad hoc or a periodic basis or as demand changes. In one implementation, the network topology is updated regularly at 5-minute intervals. According to other implementations, other update intervals may be used, including 10 minutes, 15 minutes, and larger intervals, including intervals of several hours or more. According to other implementations, the updating may be triggered at irregular intervals, e.g., by network metrics indicating that network efficiency has dropped over an observed interval, or when updated estimates of demand are received.

In the exemplary implementation just described, the network topology configuration module 205 determines the network topology according to a linear programming methodology. We denote the demand (received by the demand analysis module 204 in phase 1101) from node i to j by $d_{ij}$, the capacity allocated between nodes i and j by $L_{ij}$, and the amount of traffic routed from demand $d_{ij}$ on the mn link by $r_{ij,mn}$. For the sake of simplifying the explanation of the operation of the network topology configuration module 205, an implementation is discussed first in which the network topology configuration module 205 is building a network that maximizes the total throughput given certain demands. Thus, the network topology configuration module 205 determines constraints to the network topology (Phase 1102) and determines an objective function (Phase 1103) in the following way:

maximize $\Sigma_{(i,j,m,n)}(r_{ij,mn})$ s.t.

$\Sigma_k(r_{ij,ik}) \leq d_{ij}$ (1)
$\Sigma_{(m,n)}(r_{mn,ij}) \leq L_{ij}$ (2)
$\Sigma_k(L_{ik})$=constant_node_degree (3)
$\Sigma_u(r_{ij,uv})=\Sigma_w(r_{ij,vw})$ for v different from i and j (4)
$\Sigma_u(r_{ij,uv})=\Sigma_v(r_{ij,vj})$ (5)
$L_{ij}=L_{ji}$ are integers (6)
$L_{ij}, r_{ij,mn} \geq 0$ (7)

Condition (1) ensures that the traffic routed is not more than that demanded. Condition (2) ensures that link capacities are not exceeded. Condition (3) ensures that the aggregate capacity of links from/to a node is bounded. Conditions (4) and (5) ensure that flows between a source a destination are preserved across all nodes traversed other than the source and destination nodes.

In further implementations, the above formulation can be extended to provide some joint fairness and throughput guarantees such as simultaneously maximizing the minimum throughput m allocated across each demand and, subject to that, maximizing the throughput. In this case the objective function (Phase 1103) of the network topology configuration module 205 can be rewritten as:

maximize $m + \epsilon^* \Sigma_{(i,j,m,n)}(r_{ij,mn})$ where $\epsilon$ is a very small constant and m is a variable such that:

$\Sigma_k(r_{ij,ik}) \geq m$ (6)

In some implementations, for a sufficiently large constant_node_degree the actual integer program is approximated by properly rounding the value $L_{ij}$ of the corresponding linear program. In other implementations, the network topology configuration module 205 employs a simpler formulation to reduce the number of constraints and variables (Phase 1102) by practically allowing routing via one or two-hop paths only. In particular, $d_{ij}$ is routed via one hop flows $q_{ij}$ and two-hop flows (where each two-hop flow denoted by $p_{ij,k}$ connects at node k). Based on this simplification, the problem addressed by the network topology configuration module 205 can be rewritten as follows:

maximize $m + \epsilon^*(\Sigma_{(i,j)}(q_{ij}) + \Sigma_{(i,j,k)}(p_{ij,k}))$ s.t.

$q_{ij} + \Sigma_k(p_{ij,k}) \leq d_{ij}$ (1)
$q_{ij} + \Sigma_k(p_{ij,k}) \geq m$ (2)
$q_{ij} + \Sigma_k(p_{ik,j}) \leq L_{ij}$ (3)
$\Sigma_k(L_{ik})$=constant_node_degree (4)
$L_{ij}=L_{ji}$ are integers
$q_{ij}, L_{ij}, p_{ij,k} > 0$ In other implementations, the network topology configuration module 205 can redefine m as the ratio of the throughput which is guaranteed to be simultaneously satisfied per each demand, thus replacing (2) by the following constraint:

$q_{ij} + \Sigma_k(p_{ij,k}) \geq m^* d_{ij}$

Once the network topology configuration module 205 has determined the constraints (Phase 1102) and objective function (Phase 1103) as described above, it performs an optimization of the objective function subject to the constraints using a linear program (Phase 1104). The results of this linear program are then used by the network topology dissemination module 206 to configure the network topology in the datacenter according to the results of the optimization (Phase 1105).

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein.

The above-described implementations can be implemented using hardware, software or a combination thereof. When implemented in software, the software code can be executed on any suitable processor or collection of processors, whether provided in a single computer system ("computer") or distributed among multiple computers.

Further, it should be appreciated that a computer may be embodied in any of a number of forms, such as a group-mounted computer, a desktop computer, a laptop computer, a server computer, a cloud-based computing environment, a tablet computer, etc. Additionally, a computer may be embedded in a device not generally regarded as a computer but with suitable processing capabilities, including a Personal Digital Assistant (PDA), a smart phone or any other suitable portable or fixed electronic device.

The various methods or processes outlined herein may be coded and executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various implementations of the invention discussed above. The computer readable medium or media can be transportable, such that the program or programs stored thereon can be loaded onto one or more different computers or other processors to implement various aspects of the present invention as discussed above. Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. The recitation of a module, logic, unit, or circuit configured to perform a function includes discrete electronic and/or programmed microprocessor portions configured to carry out the functions. For example, different modules or unit that perform functions may be embodied as portions of memory and/or a microprocessor programmed to perform the functions.

Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

What is claimed is:

1. A system for configuring a network topology in a data center, the data center comprising a plurality of nodes, each node comprising ports capable of supporting data links that can be connected to a selected other node of the plurality of nodes, the system comprising:
    a memory to store processor-executable instructions; and
    a processing unit coupled to the memory, wherein execution of the processor-executable instructions by the processing unit causes the processing unit to:
        receive demand information indicative of expected demand for data-transfer capacities between ordered pairs of nodes in the plurality of nodes;
        determine a set of constraints on the network topology based on the nodes, feasible data links between the nodes, and the demand information;
        determine an objective function based on a sum of data throughput across data links in the data center satisfying demands according to the demand information, wherein the objective function is further based on a minimum throughput allocated for satisfying each demand;
        perform an optimization of the objective function subject to the set of constraints using a linear program; and
        configure the network topology in the data center by establishing data links between the nodes in the plurality of nodes according to results of the optimization.

2. A system according to claim 1, wherein the objective function is the sum of data throughput across data links in the data center.

3. A system according to claim 1, wherein the objective function is a weighted sum of 1) the sum of the data throughput across data links in the data center and 2) the minimum throughput allocated for satisfying each demand.

4. A system according to claim 1, wherein the network topology is limited to direct connections between nodes and two-hop connections between nodes.

5. A system according to claim 1, wherein the objective function is further based on a ratio of the data throughput that is guaranteed to be simultaneously satisfied per each demand.

6. A system according to claim 1, wherein each node comprises an equal number of ports.

7. A system according to claim 6, wherein each port has an equal capacity.

8. A system according to claim 7, wherein each port has equal incoming and outgoing capacities.

9. A method for configuring a network topology in a data center, the data center comprising a plurality of nodes, each node comprising ports capable of supporting data links that can be connected to a selected other node of the plurality of nodes, the method comprising:
    receiving demand information indicative of expected demand for data-transfer capacities between ordered pairs of nodes in the plurality of nodes;
    determining a set of constraints on the network topology based on the nodes, feasible data links between the nodes, and the demand information;
    determining an objective function based on a sum of data throughput across data links in the data center satisfying demands according to the demand information, wherein the objective function is further based on a minimum throughput allocated for satisfying each demand;

performing an optimization of the objective function subject to the set of constraints using a linear program; and configuring the network topology in the data center by establishing data links between the nodes in the plurality of nodes according to results of the optimization.

10. A method according to claim 9, wherein the objective function is the sum of data throughput across data links in the data center.

11. A method according to claim 9, wherein the objective function is a weighted sum of 1) the sum of the data throughput across data links in the data center and 2) the minimum throughput allocated for satisfying each demand.

12. A method according to claim 9, wherein the network topology is limited to direct connections between nodes and two-hop connections between nodes.

13. A method according to claim 9, wherein the objective function is further based on a ratio of the data throughput that is guaranteed to be simultaneously satisfied per each demand.

14. Non-transitory computer-readable storage media storing processor-executable instructions, which, when executed by one or more processors, cause the one or more processors to:

receive demand information indicative of expected demand for data-transfer capacities between ordered pairs of nodes in a plurality of nodes in a data center, wherein each node comprises ports capable of supporting data links that can be connected to a selected other node of the plurality of nodes;

determine a set of constraints on a network topology in the data center based on the nodes, feasible data links between the nodes, and the demand information;

determine an objective function based on a sum of data throughput across data links in the data center satisfying demands according to the demand information, wherein the objective function is further based on a minimum throughput allocated for satisfying each demand;

perform an optimization of the objective function subject to the set of constraints using a linear program; and configure the network topology in the data center by establishing data links between the nodes in the plurality of nodes according to results of the optimization.

15. Non-transitory computer-readable storage media according to claim 14, wherein the objective function is the sum of data throughput across data links in the data center.

16. Non-transitory computer-readable storage media according to claim 14, wherein the objective function is a weighted sum of 1) the sum of the data throughput across data links in the data center and 2) the minimum throughput allocated for satisfying each demand.

17. Non-transitory computer-readable storage media according to claim 14, wherein the network topology is limited to direct connections between nodes and two-hop connections between nodes.

18. Non-transitory computer-readable storage media according to claim 14, wherein the objective function is further based on a ratio of the data throughput that is guaranteed to be simultaneously satisfied per each demand.

* * * * *